(12) United States Patent
Crary et al.

(10) Patent No.: US 6,634,341 B2
(45) Date of Patent: *Oct. 21, 2003

(54) VENT AND ROLLOVER VALVE AND FUEL PUMP MODULE

(75) Inventors: Lynwood F. Crary, Preston, CT (US); Mark R. Johansen, Wallingford, CT (US)

(73) Assignee: Walbro Corporation, Cass City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/975,829

(22) Filed: Oct. 12, 2001

(65) Prior Publication Data

US 2002/0017281 A1 Feb. 14, 2002

Related U.S. Application Data

(63) Continuation-in-part of application No. 09/755,478, filed on Jan. 5, 2001, now Pat. No. 6,311,675, which is a continuation-in-part of application No. 09/300,929, filed on Apr. 28, 1999, now Pat. No. 6,213,100.

(51) Int. Cl.[7] .............................................. F02M 37/04
(52) U.S. Cl. ............................ 123/516; 137/43; 137/39
(58) Field of Search ................................ 123/516, 520, 123/519, 518, 198 D; 137/39, 43, 202

(56) References Cited

U.S. PATENT DOCUMENTS

| 4,646,772 A | | 3/1987 | Bergsma |
|---|---|---|---|
| 4,697,991 A | | 10/1987 | Tsukahara et al. |
| 4,753,262 A | | 6/1988 | Bergsma |
| 4,991,615 A | * | 2/1991 | Szlaga et al. ................... 137/43 |
| 5,038,741 A | | 8/1991 | Tuckey |
| 5,044,389 A | * | 9/1991 | Gimby ........................... 137/39 |
| 5,146,901 A | * | 9/1992 | Jones ........................... 123/516 |
| 5,172,714 A | * | 12/1992 | Kobayashi et al. ............... 137/39 |
| 5,183,087 A | * | 2/1993 | Aubel et al. .................. 123/518 |
| 5,219,277 A | | 6/1993 | Tuckey |
| 5,257,916 A | | 11/1993 | Tuckey |
| 5,261,439 A | * | 11/1993 | Harris ........................... 137/43 |
| 5,313,977 A | | 5/1994 | Bergsma et al. |
| 5,520,155 A | | 5/1996 | Hefler |
| 5,579,742 A | | 12/1996 | Yamazaki et al. |
| 5,590,697 A | | 1/1997 | Benjey et al. |
| 5,596,971 A | | 1/1997 | Kidokoro |
| 5,718,208 A | | 2/1998 | Brautigan et al. |
| 5,749,347 A | | 5/1998 | Torii et al. |
| 5,755,252 A | * | 5/1998 | Bergsma et al. ............. 137/202 |
| 5,762,049 A | | 6/1998 | Jones et al. |
| 5,797,434 A | | 8/1998 | Benjey et al. |
| 5,809,976 A | * | 9/1998 | Cook et al. .................. 123/516 |
| 5,860,458 A | | 1/1999 | Benjey et al. |
| 5,950,655 A | | 9/1999 | Benjey |
| 5,954,082 A | | 9/1999 | Waldorf et al. |
| 5,960,817 A | | 10/1999 | Johansen et al. |
| 5,983,958 A | | 11/1999 | Bergsma et al. |
| 6,085,771 A | * | 7/2000 | Benjey et al. ............. 137/15.26 |
| 6,145,532 A | * | 11/2000 | Tuckey et al. .............. 137/202 |

* cited by examiner

Primary Examiner—Carl S. Miller
(74) Attorney, Agent, or Firm—Reising, Ethington, Barnes, Kisselle, P.C.

(57) ABSTRACT

A high flow rate fuel vapor vent and rollover valve assembly with a float valve that provides a progressive closing of a vapor outlet to control the venting of fuel vapors from a fuel tank and the addition of liquid fuel to the tank. The float closes a portion of the vapor outlet in response to liquid fuel at a first level in a vehicle fuel tank. A body completely closes the vapor outlet in response to rollover attitudes of the vehicle. One or more separate baffles are constructed and arranged to prevent the escape of liquid fuel through the vapor outlet.

32 Claims, 5 Drawing Sheets

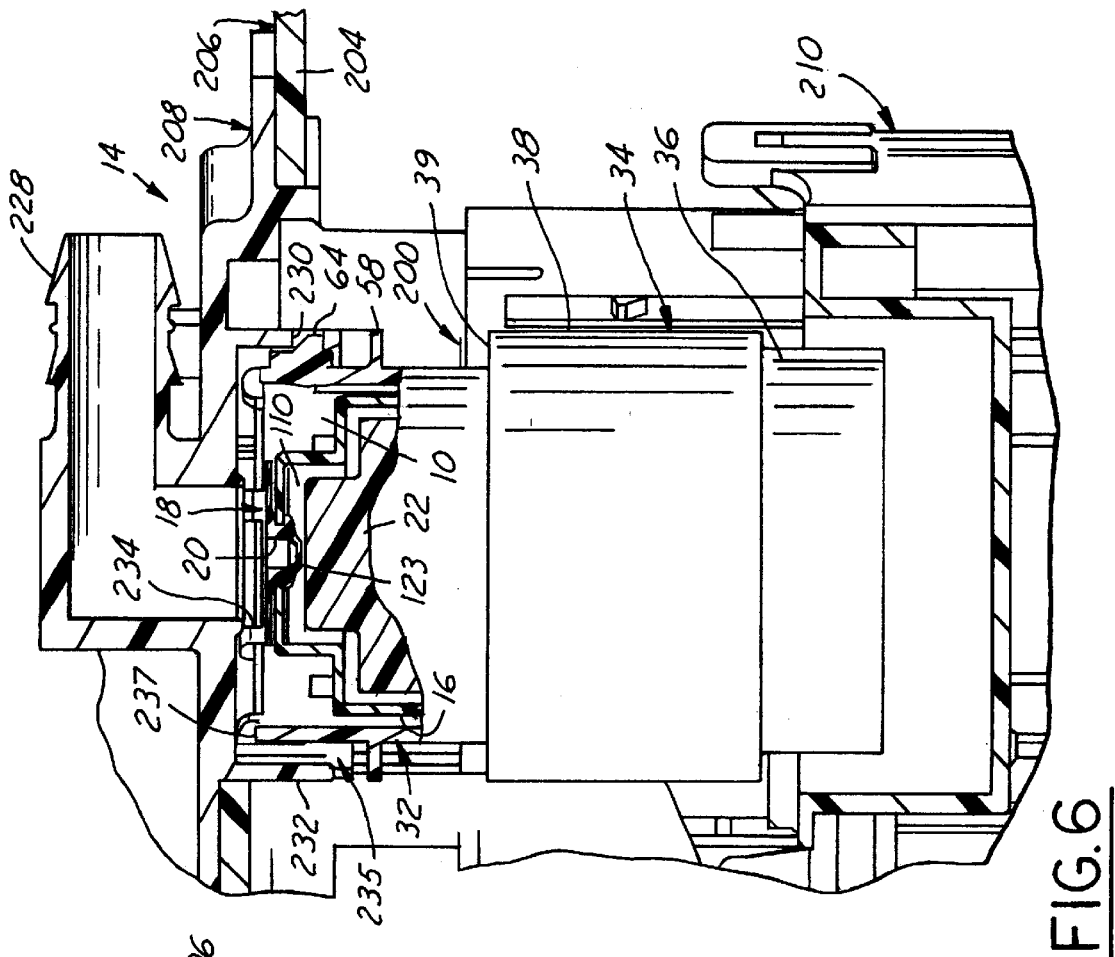
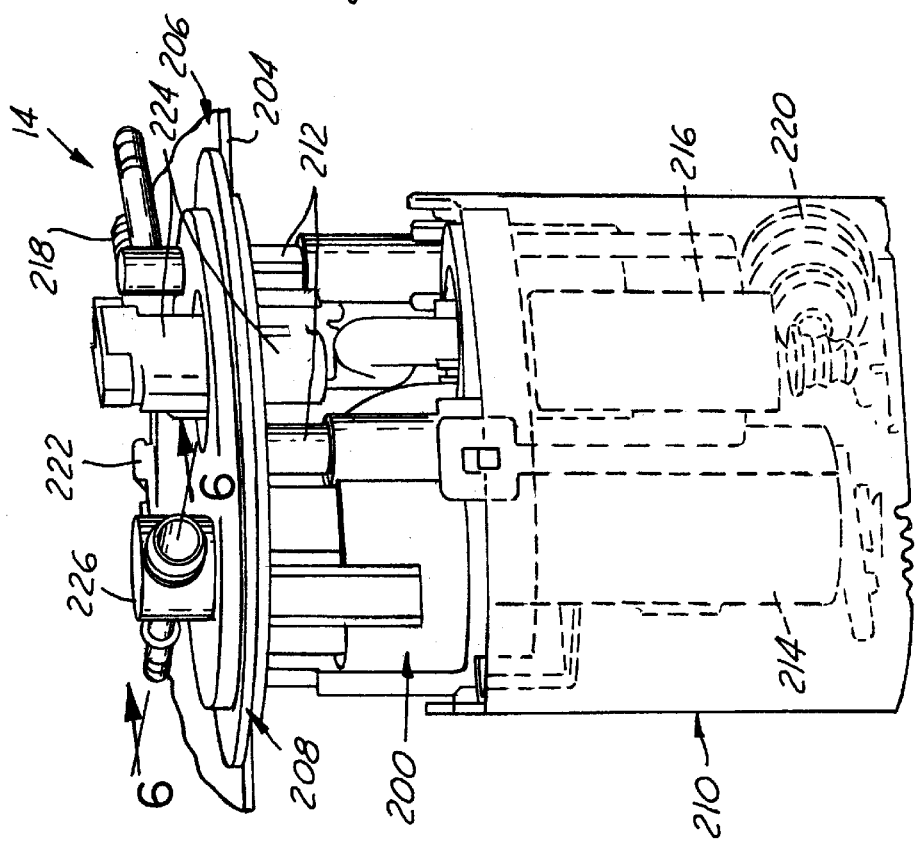

VENT AND ROLLOVER VALVE AND FUEL PUMP MODULE

REFERENCE TO RELATED APPLICATIONS

This patent application is a continuation-in-part of U.S. patent application Ser. No. 09/300,929, filed on Apr. 28, 1999, now U.S. Pat. No. 6,213,100 B1, issued on Apr. 10, 2001, and U.S. patent application Ser. No. 09/755,478, filed on Jan. 5, 2001 as a continuation-in-part now U.S. Pat. No. 6,311,675 thereof.

FIELD OF THE INVENTION

This invention relates generally to vehicle fuel systems and more particularly to a vapor vent and rollover valve for a vehicle fuel tank and a fuel pump module incorporating such a vapor vent and rollover valve.

BACKGROUND OF THE INVENTION

Environmental concerns and governmental regulations require reduced emissions of volatile hydrocarbon fuel vapors into the atmosphere. One source of hydrocarbon fuel vapors is fuel tanks of vehicles using gasoline or other hydrocarbon fuels with high volatility. Fuel vapor can escape to the atmosphere during the filling of the tanks and usually, even after the tanks are filled. The use of an onboard vapor recovery system to remove excess fuel vapor from the fuel tank is one solution to the problem. Typically, a canister with activated charcoal therein receives fuel vapors through a valve assembly mounted in the top of the fuel tank and communicates with the intake manifold of the vehicle engine for withdrawing fuel vapor from the canister during operation of the engine. The valve assembly may have a valve responsive to the level of fuel in the tank that enables the valve to stay open at a sufficiently low fuel level to permit fuel vapors to flow from the fuel tank into the canister. As the fuel level rises during filling to approach a desired maximum fuel level or quantity of fuel in the tank, a float is raised to close the valve to prevent liquid fuel from flowing through the valve and into the vapor canister. The closed valve also prevents fuel vapor from flowing into the vapor canister. One such system is disclosed in U.S. Pat. No. 5,579,802.

Some of these systems require a high capacity or high flow rate to control the flow of vapor from the fuel tank to the vapor storage canister. Current high capacity or high flow rate valve designs tend to be forced into and held in a closed position, when they should be open, by the vapor pressure in the fuel tank. This prevents vapor from flowing through the valve and into the vapor storage canister defeating the purpose of the system. Further, prior fuel level and vapor vent valves with a single float responsive to the fuel level in the fuel tank to close the valve, maintains the valve closed while the fuel level remains at or near the desired maximum level of fuel in the tank to limit the amount of liquid fuel which undesirably escapes through the valve. Maintaining the valve closed while the fuel level remains at or near the maximum level of fuel in the tank is undesirable because the addition of fuel to the tank when the valve is closed will rapidly increase the pressure within the tank and increase the discharge of hydrocarbon fuel vapors into the atmosphere during filling and in vehicle use prohibit the flow of fuel vapor to the canister.

Further, when a vehicle stops, turns rapidly or is travelling across rough terrain significant splashing or sloshing of fuel in the fuel tank can occur. It has been found that the splashing and sloshing of fuel in the tank is particularly bad when the tank is between ¼ and ¾ full. Conventional vapor vent valves permit an undesirable amount of liquid fuel to escape from the fuel tank through the vent valve whereupon it flows to the fuel vapor canister which has a limited volume and storage capacity and is rapidly filled by liquid fuel. Typically, the liquid fuel escapes from conventional vent valves because the outlet thereof is not adequately protected from sloshing or splashing fuel and the valve closure mechanism is not responsive enough to rapidly close the valve and prevent such liquid fuel escape.

Typically, a separate rollover valve is used in a fuel system in series with a vapor vent valve. In normal at rest and operating upright positions or attitudes of the vehicle, the rollover valve is open to permit fuel vapor to flow to the canister and while the vehicle is on its side or rolled over such as in and after an accident, the rollover valve is closed to prevent liquid fuel flow from the tank through the vent valve.

Typical vapor vent valves and rollover valves are mounted within openings through the vehicle fuel tank, and a fuel pump is mounted through a separate opening in the fuel tank. Additional openings through the fuel tank may be provided to mount additional components such as an over-pressure relief valve and the like. Each opening through the fuel tank provides a leak path through which hazardous hydrocarbon fuel vapors may escape to the atmosphere.

SUMMARY OF THE INVENTION

A high flow rate fuel vapor vent and rollover valve assembly utilizing a float valve that provides a progressive partial closing of a vapor outlet to control the venting of fuel vapors from a fuel tank and the addition of liquid fuel to the tank. A float closes a portion of the vapor outlet in response to liquid fuel at a first level relative to the valve. A body or weight closes the remainder of the vapor outlet in response to rollover of the vehicle to prohibit the escape of liquid fuel and vapor from the vehicle tank during rollover attitudes of the vehicle. One or more separate baffles are constructed and arranged to prevent the escape of liquid fuel through the vapor outlet when the valve is open.

Preferably, to reduce the number of openings in the fuel tank and to simplify manufacture and assembly of the vapor vent and rollover valve assembly, it can be formed at least in part as an integral portion of a fuel pump module disposed within the fuel tank. Ideally, an upper portion of the valve assembly defining the vapor outlet can be formed as an integral portion of a flange of the fuel pump module sealed to the fuel tank. This eliminates a leak path around a separate body of the valve assembly defining the vapor outlet to reduce the likelihood of liquid fuel escaping from the fuel tank. Still further, providing the vapor vent and rollover valve assembly integral with the fuel pump module prevents damage to the valve assembly should a lower portion of the fuel pump module, containing the fuel pump, break away from the upper flange sealed to the fuel tank during a vehicle accident.

Objects, features, and advantages of this invention include providing a vapor vent and rollover valve assembly which has a high flow rate or capacity, opens and closes in response to the level of fuel in the tank, prevents liquid fuel from escaping from the fuel tank to the vapor receiving canister, closes in a vehicle roll-over condition, limits the maximum level of fuel within the fuel tank during filling, enables multiple shut-offs of a fuel filler nozzle during filling of the fuel tank, at least substantially prevents sloshing or splashing liquid fuel from escaping through the vapor outlet, and is rugged, durable, reliable, of relatively simple design and economical manufacture and assembly and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 5 is a perspective view of a fuel pump module which carries a vapor vent and rollover valve assembly according to the invention;

FIG. 6 is a fragmentary sectional view of the fuel pump module illustrating the vapor vent and rollover valve assembly.

DETAILED DESCRIPTION OF THE PREFERRED EMBODIMENTS

Figure 1:
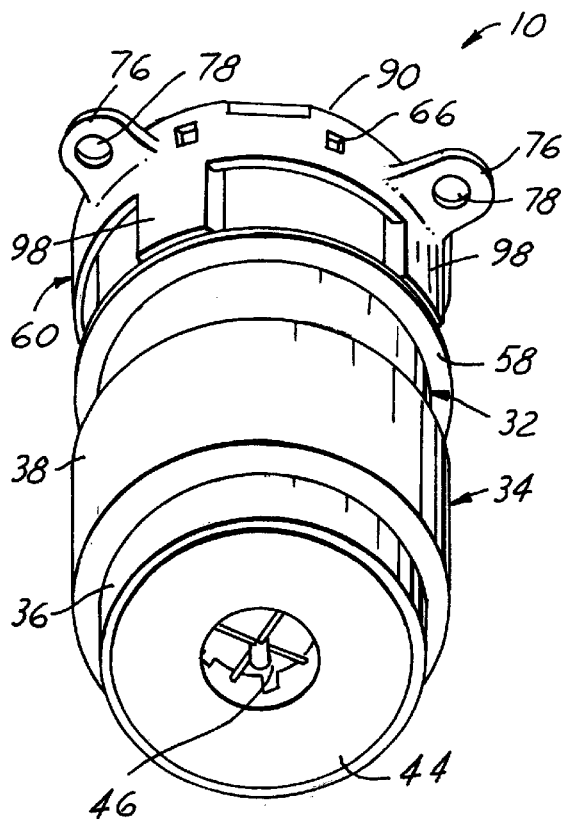
FIG. 1 is a perspective view of a vapor vent and rollover valve assembly according to the invention and illustrating a lower portion of the assembly.
Figure 2:
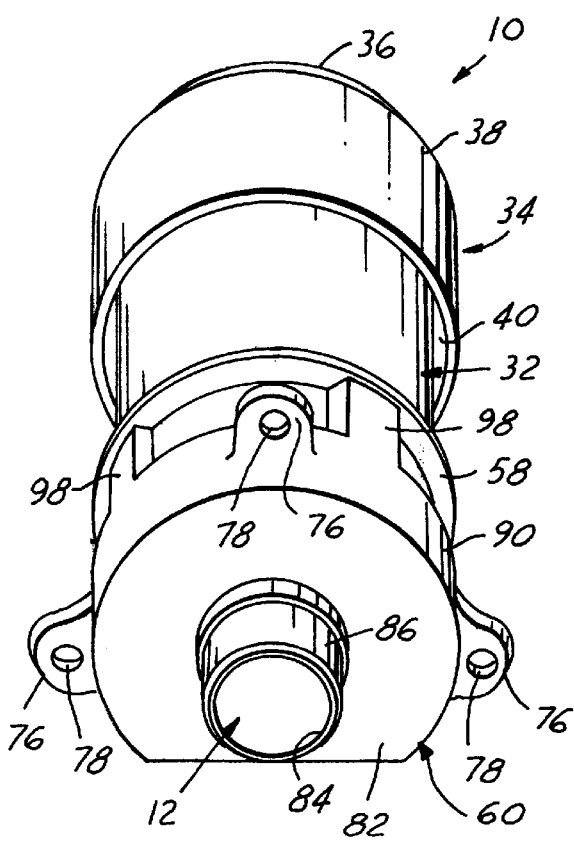
FIG. 2 is a perspective view of the valve assembly of FIG. 1 illustrating an upper portion of the assembly.
Figure 3:
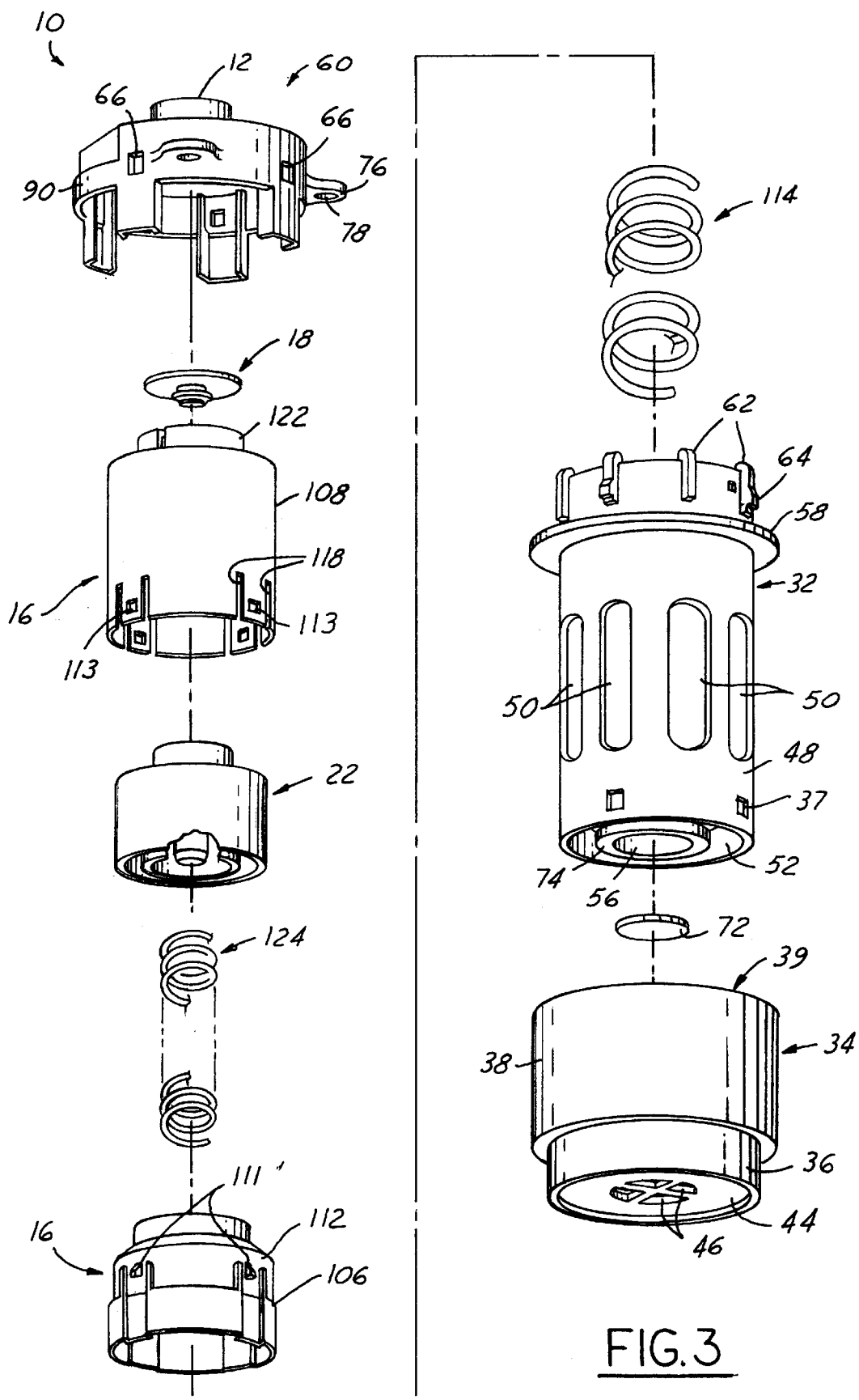
FIG. 3 is an exploded assembly view of the vapor vent and rollover valve assembly.
Figure 4:
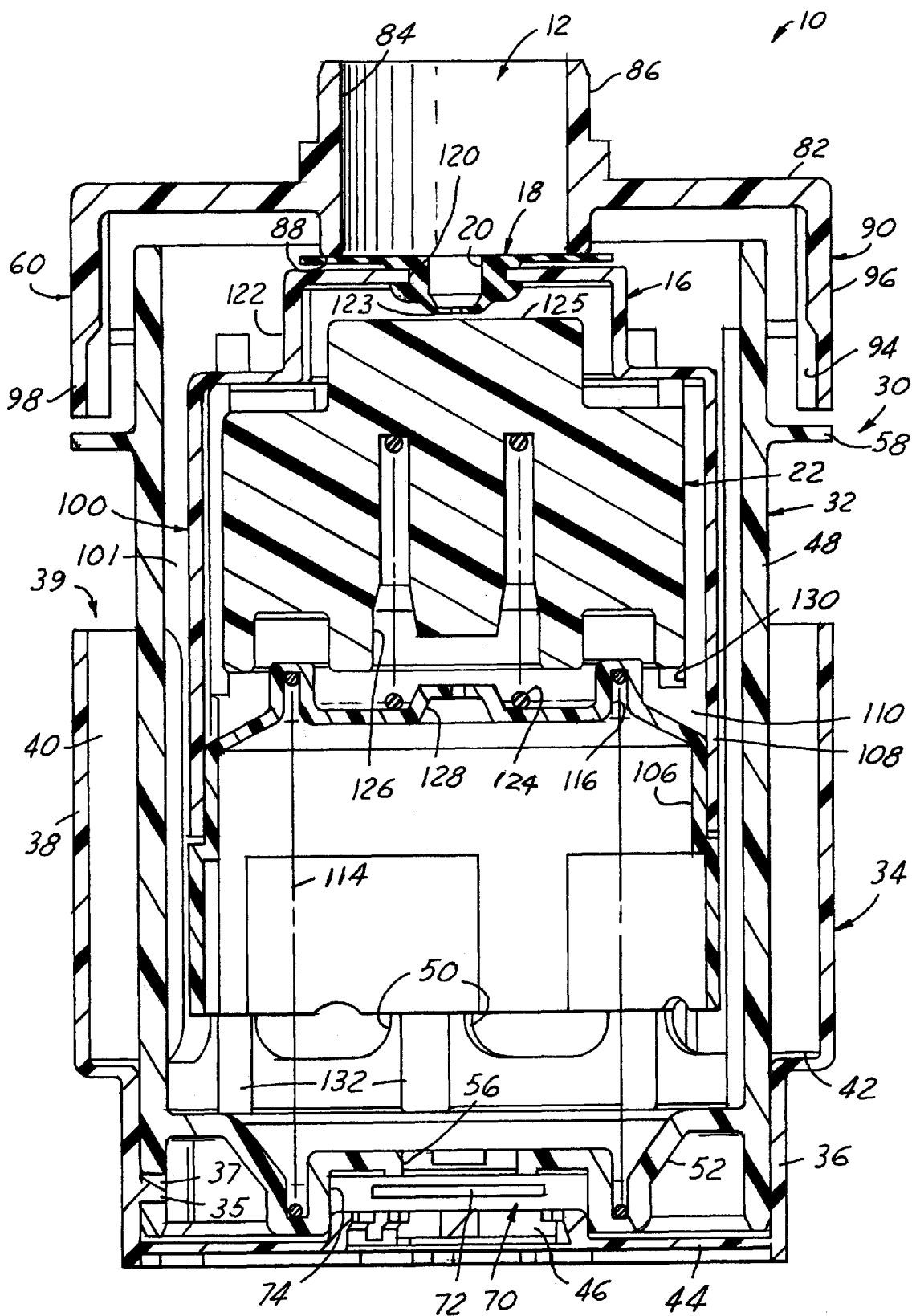
FIG. 4 is a cross-sectional view of the vapor vent and rollover valve assembly.

Referring in more detail to the drawings, FIG. 1 illustrates a fuel vapor vent and rollover valve 10 constructed to be mounted on a vehicle fuel tank, to communicate with the interior of the fuel tank and to selectively permit fuel vapor to flow out of the fuel tank through a vapor outlet 12 of the vent valve 10. The vapor vent valve 10 may be a stand alone component which can be separately mounted on the fuel tank or, as shown in FIGS. 5 and 6, may be incorporated as a portion of a fuel pump module 14 mounted on the fuel tank. As shown in FIGS. 3 and 4, the vent valve 10 has a first float 16 which carries a closure 18 engageable with the vapor outlet 12 to substantially close the outlet 12. The closure 18 has a passage 20 formed therethrough to permit a controlled flow of vapor through the outlet 12 even when the closure 18 is engaged therewith. The vapor vent valve 10 also has a second body or weight 22 movable relative to the first float 16 and adapted to selectively close off fluid flow through the passage 20 and insure the closure of outlet 12 to prevent all fluid flow out of the vapor outlet 12 of the valve 10 during rollover attitudes of the vehicle.

Desirably, the first stage shut off of the vapor outlet 12 also controls the filling or refueling of the fuel tank. During refueling, when the closure 18 engages the vapor outlet 12, vapor flow out of the tank is restricted and the pressure within the tank increases. This causes fuel to back up within a fill pipe of the fuel tank, with liquid fuel closing off a control port of a refueling nozzle of a fuel station fuel dispensing pump to actuate an automatic shut-off device in the nozzle in a known manner and prevent additional fuel from being added to the tank. Due to dissipation of this relatively rapid rise in pressure, the closure 18 may move away from the vapor outlet 12 and/or the fuel vapor in the tank may vent through the passage 20 of the closure 18 to reduce the pressure in the tank. Thus, in some circumstances, a small quantity of additional fuel may be added to the tank even after the first shut-off event. However, further attempts to fill the tank will result in relatively rapid subsequent shut-off events caused by reengagement or continued engagement of the closure with the vapor outlet 12, thereby inhibiting overfilling of the fuel tank and maintaining a vapor dome in the upper portion of the fuel tank and in communication with the vapor vent valve 10. Usually, the closure 18 remains engaged with the vapor outlet 12 and does not move away after the initial shut-off event and does remain so engaged after subsequent shut-off events. During refueling and these shut-off events, normally the passage 20 of the closure remains open and is not closed by any movement of the body 22. Both the passage 20 and the closure 18 are closed to completely close the outlet 12 by the weight 22 during vehicle rollover attitude conditions to prevent escape from the tank of both liquid fuel and fuel vapor through the outlet 12.

The vapor outlet 12 of the vent valve 10 typically communicates with a fuel vapor canister downstream of the vent valve and the fuel tank. The canister is filled with activated charcoal to absorb the hydrocarbon vapors received from the valve assembly. The canister has an outlet through which fuel vapor is discharged to an intake manifold of an engine for combustion of the fuel vapors in the normal combustion cycle of the engine. The canister may be mounted in various locations in the vehicle and is connected to the vent valve 10 by a suitable flexible hose.

The vent valve 10 has a housing 30 defined in part by a generally cylindrical and tubular shell 32 and an outer fill cup 34 surrounding a portion of the shell 32. The fill cup 34 has a reduced diameter base 36 in which the shell 32 is closely received preferably, as shown in FIG. 4, by a snap-fit of flexible fingers 35 on the fill cup 34 disposed into complementary slots 37 in the shell 32. An enlarged diameter sidewall 38 extends from the base 36 to an open end 39 of the fill cup defining an annular gap 40 between the sidewall 38 and the shell 32. The sidewall 38 is open at its upper end 39 to permit liquid fuel to flow over the sidewall 38 and into the gap 40. A plurality of radially inwardly and axially extending ribs 42 may be formed in the sidewall 38 to position the shell 32 therein. The fill cup 34 has a bottom wall 44 which spans the base 36 with through holes 46 permitting fluid flow therethrough. The fill cup 34 and shell 32 are preferably formed of a material resistant to degradation from exposure to hydrocarbon fuels, and are preferably a polymeric material such as Acetal.

The shell 32 has a sidewall 48 in which at least one and preferably a plurality of slots 50 are formed to permit liquid fuel to flow readily through the shell 32. The slots 50 preferably extend at an axial height equal to or below the height of the sidewall 38 of the fill cup 34 so that the sidewall 38 shields or protects against splashing fuel travelling upwardly relative to the vent valve 10 and through the slots 50 to prevent such upwardly travelling fuel from escaping out of the vent valve 10. A bottom wall 52 of the shell 32 substantially closes off its lower end with one or more through holes 56 permitting fluid flow therethrough.

A radially outwardly extending and preferably circumferentially continuous flange 58 is provided on the sidewall 48 above the slots 50 of the shell. The flange 58 extends sufficiently radially outward to direct any liquid fuel which lands on top of the flange 58 away from the fill cup 34 to return such fuel to the fuel tank. To facilitate locating and connecting an upper cap 60 to the shell 32, a plurality of radially outwardly extending tabs 62 (FIG. 3) are provided at the upper end of the shell 32 extending out of the cup 34. At least some of these tabs 62 have radially outwardly extending catches 64 constructed to snap-fit into complimentary openings 66 in the cap 60. The remaining tabs 62 provide additional separation between the cap 60 and sidewall 48 to provide flow paths between them through which fuel vapor may flow into the valve 10.

Desirably, a check valve 70 controls the flow of fluid through the holes 46, 56 of the bottom walls 44, 52 of the cup 34 and shell 32. The check valve 70 may be a generally flat disc 72 disposed between the bottom walls 44, 52 and retained and located by a circular recess 74 formed in the bottom wall 52 of the shell 32. Desirably, the disc 72 is responsive when acted on by liquid fuel to close the openings 56 in the bottom wall 52 of the shell 32 and prevent liquid fuel flow from the fuel tank through these openings 56. When the disc 72 is not immersed in liquid fuel, any fuel within the shell 32 may flow out of the valve 10 through the openings 56, past the disc 72 and back into the fuel tank.

The cap 60 preferably has a plurality of radially outwardly extending mounting tabs 76 with through holes 78 constructed to receive pins (not shown) on the fuel tank which locate the vent valve 10 relative to the fuel tank and which may be heat staked to mount and seal the vent valve 10 to the fuel tank. The cap 60 has an upper wall 82 with a throughbore 84 defining the vapor outlet 12 through which fuel vapor may escape from the fuel tank through the vent valve 10. The vapor outlet 12 is defined in part by a nipple 86 extending from the upper wall 82 to receive a suitable conduit communicating the vent valve 10 with a fuel vapor canister or the like. Additionally, an annular depending valve seat 88 may be provided surrounding the outlet 12. The cap 60 has a circumferential depending skirt 90 extending from its upper wall 82 and surrounding an upper portion of the shell 32 in assembly. A plurality of slots 66 are formed in the skirt 90 each adapted to receive a catch 64 of a separate one of the tabs 62 on the shell 32 to connect and retain the cap 60 to the shell 32. The flange 58 on the sidewall 48 of the shell 32 is preferably disposed adjacent to the lower edge of the skirt 90 with the flange 58 extending radially outwardly at least to the extent of an inner surface 94 of the skirt 90 and desirably at least to and preferably farther outwardly than an outer wall 96 of the skirt 90 to inhibit and preferably prevent splashing or sloshing liquid fuel from flowing between the skirt 90 and shell 32 and through the outlet 12 out of the valve 10. The cap may also have finger-like shrouds 98 extending from the skirt in the area of the slots 66 to provide a further shield from sloshing fuel.

To control the flow of fluid through the vent and rollover valve 10, a float assembly 100 is slidably received in an interior space 101 defined between the shell 32, its bottom wall 52 and the cap 60. The float assembly 100 comprises the first float 16 and second body 22 preferably slidably received in the float assembly. The first float 16 is preferably defined by a pair of inverted cup shaped shells 106, 108 preferably interconnected by a snap-fit to define an inner chamber 110 in which the second body 22 is received. The lower shell 106 may have a reduced diameter nose 112 adapted to be received within the upper shell 108 with a plurality of radially outwardly extending catches 111 snap-fit in corresponding openings 113 in the upper shell 108 to connect them together. To retain one end of a spring 114 which yieldably biases the float assembly 100 toward its closed position, the lower shell 106 preferably has an annular recess 116 formed therein. The other end of the spring 114 is preferably disposed over and retained by the circular recess 74 in the bottom wall 52 of the shell 32. The upper shell 108 preferably has one or more through holes or slots 118 formed therein communicating the exterior of the float assembly 100 with the chamber 110 in which the second body 22 is received to permit fluid flow into the chamber 110. A through hole 120 is preferably provided in a nose portion 122 of the upper shell 108 with the through hole 120 being generally aligned or coaxial with the vapor outlet 12 of the cap 60. The closure 18 is press-fit or snap fit within the through hole 120 and is adapted to engage the valve seat 88 as shown in FIG. 4, when the first float 16 is moved sufficiently away from the bottom wall 52 of the shell 32. The passage 20 of the closure communicates the vapor outlet 12 with the chamber 110 even when the closure 18 is engaged with the valve seat 88. The closure 18 extends through the hole 120 and defines a second valve seat 123 in the chamber 110.

The second body 22 is slidably received within the chamber 110 and is preferably yieldably biased towards the closure 18 by a spring 124. The second body 22 has a valve head 125 and an annular recess 126 which retains one end of the spring 124 with the other end of the spring 124 retained on a circular projection 128 of the lower shell 106 of the first float 16.

The second body 22 (in conjunction with the force of the spring 124 acting thereon) has a predetermined mass sufficient (A) when the valve assembly 110 is in a vehicle in a normal upright attitude to prohibit its head 125 from engaging the valve seat 123 and closing passage 20 even though the fuel tank has just been refueled and filled to its normal "full" level and (B) when the vehicle and the valve assembly 110 are in a rollover attitude to engage its head 125 with the seat 123 and close both the passage 20 and cause the closure 18 to engage the valve seat 88 and thereby completely close off the outlet 12 even if the entire valve assembly 100 is submerged and completely immersed in liquid fuel in the tank.

Desirably, the weight of the second body 22 is chosen such that when after a rollover the vehicle is returned to its normal upright attitude and liquid fuel is no longer within the chamber 110 the weight of the second body 22 is sufficient to disengage its head 125 from the valve seat 123 and reopen the passage 20 through the closure 18. The weight of the second body 22 and the spring rate and force of the spring 124 biasing it are also chosen such that if the vent valve 10 is in a rollover attitude, such as during a vehicle roll-over accident, the head 125 of the second body 22 will be urged into engagement with the valve seat 123 of the closure 18 even when the valve assembly 100 is submerged in liquid fuel, to prevent liquid fuel from flowing through the closure 18 and out of the vapor outlet 12. Likewise, the weight of the entire float assembly 100 and the spring rate and force of the spring 114 biasing it are chosen such that during a vehicle rollover condition such as an accident the first float 16 will be displaced to engage the closure 18 with the valve seat 88 of the cap 60 to prevent liquid fuel from flowing out of the vapor outlet 12 therethrough. Desirably, to limit friction between the second body 22 and first float 16 the upper shell 108 has a plurality of axially elongate and radially inwardly extending ribs 130. Likewise, to guide the first float 16 and reduce friction between it and the inner wall of the shell 32, a plurality of axially elongate and spaced apart ribs 132 are provided in the shell 32.

Accordingly, the vent and rollover valve 10 is comprised of a plurality of relatively simple components which are preferably snap-fit together for ease of assembly and manufacture. The valve 10 is constructed and arranged to limit or prevent liquid fuel from escaping from the fuel tank therethrough during vehicle rollover attitudes and is responsive to provide a partial or first stage shut-off of the vapor valve outlet 12 during refueling to trigger the automatic shut off of the fuel filling nozzle when fuel in the tank reaches its normal "full" level and to inhibit splashing liquid fuel from entering the outlet 12 while still permitting some fuel vapor to do so. In normal upright vehicle attitudes, when the closure 18 engages the valve seat 88, the passage 20 through the closure 18 remains open, and when the vehicle is in a rollover attitude, the second body closes the passage 20 and assures the closure 18 engages the valve seat 88 to prevent fluid flow through the vapor outlet 12.

Operation

Absent liquid fuel acting on the float assembly 100, the closure 18 is not engaged with the valve seat 88 of the cap 60 and the second body 22 is likewise not engaged with the valve seat 123 of the closure 18 permitting fuel vapors within the fuel tank to flow through the vapor passage between the skirt 90 and sidewall 48 and out of the vapor outlet 12. Fuel vapor may also flow through the slots 50 in the shell 32 around the float assembly 100 and out of the vapor outlet 12, or through the float assembly 100 and the passage 20 through the closure 18 and out of the vapor outlet 12 for delivery to a fuel vapor canister or other vapor receiving component, container or device.

As liquid fuel is added to the fuel tank such as by a filler nozzle of a fuel station dispensing pump, the level of fuel in the tank rises and eventually liquid fuel will engage the bottom of the fill cup 34. As liquid fuel flows through the holes 46 in the bottom wall 44 of the fill cup 34 the valve disc 72 is raised into engagement with the bottom wall 52 of the shell 32 to close its holes 56 and prevent liquid fuel from entering the interior space 101 of the valve 10 therethrough. The level of fuel in the tank continues to rise as fuel is added therein until the level of fuel reaches the open upper end 39 of the fill cup 34. When the level of fuel is higher than the fill cup 34, fuel pours into the fill cup 34 and through the slots 50 in the shell 32 rapidly filling the interior space 101 of the valve 10 to the level of fuel in the tank.

Desirably, as liquid fuel fills the interior space 101, air is trapped within the lower shell 106 of the first float 16 rendering the first float 16 and entire float assembly 100 buoyant or merely increasing its buoyancy if it is buoyant in liquid fuel. The rush of liquid fuel into the valve 10 and the air trapped in the float assembly 100 quickly raises the float assembly 100 until the closure 18 engages the valve seat 88 closing off a major portion of the vapor outlet 12. With the major portion of the vapor outlet 12 closed, the pressure within the fuel tank rises rapidly as fuel is added to the tank causing fuel to rise or back-up within the fill pipe to engage the fuel fill nozzle and actuate its automatic shut-off, temporarily stopping the addition of fuel to the tank. Because the passage 20 through the closure 18 remains open, fuel vapor may vent through the float assembly 100 and out of the vapor outlet 12 through this passage 20 to reduce the pressure within the fuel tank. Accordingly, during refueling when the pressure within the fuel tank has decreased sufficiently, under some circumstances, a small quantity of additional fuel may be added to the fuel tank. However, with any attempted further refueling, closure 18 is already engaged with or will rapidly reengage valve seat 88 closing off the major portion of vapor outlet 12, thereby causing the pressure in the fuel tank to again rapidly increase and the automatic shut-off of the filler nozzle to reoccur. Thus, repeated efforts to further refuel the tank will be futile. The time required for the pressure rise is dependent, at least in part, on the flow area of the passage 20. The larger the flow area, the shorter the time needed to vent sufficient pressure from the tank, and vice versa.

After refilling of the fuel tank is completed, the open passage 20 will reduce the pressure in the fuel tank and the differential pressure across the closure 18 sufficiently so that in operation of the vehicle engine as soon as the in-tank fuel level drops slightly, the buoyant float assembly 100 will disengage the closure 18 from the seat 88 and fully open the outlet 12 to accommodate a high rate of flow of fuel vapor from the fuel tank through the outlet 12.

In normal upright attitudes of the vehicle and valve assembly 10, the passage 20 remains open and in and during rollover attitudes the body 22 closes the passage 20 and in conjunction with the float assembly 100 insures closure 20 engages seat 88 and the outlet 12 is completely closed so that neither liquid fuel nor fuel vapor escapes from the tank through outlet 12 even if the entire valve assembly is immersed in liquid fuel.

Desirably, the vent and rollover valve 10 is constructed to at least substantially inhibit and preferably prevent escape of liquid fuel through the vapor outlet 12. Fuel splashing upwardly is prevented from entering the slots 50 of the shell 32 by the fill cup 34 which preferably extends at least as high as the slots 50. Further, the annular flange 58 of the sidewall 48 of the shell 32 prevents upwardly splashed or sloshing fuel from directly entering the vapor flow path between the skirt 90 and shell 32. Still further, any fuel which bypasses the flange 58 and enters the space between the skirt 90 and shell 32 must travel laterally over the shell 32 and further upwardly to escape out of the vapor outlet 12. This is unlikely and due to the force of gravity acting on the fuel, any fuel which enters the shell 32 will flow downwardly towards the bottom of the shell 32 through the check valve 70 when the level of fuel in the fuel tank permits. Still further, the depending skirt 90 of the cap 60 provides a shield or baffle which prevents liquid fuel from laterally entering the shell 32 and escaping through the vapor outlet 12.

To change the fuel level within the tank which causes the automatic shut-off of a fuel filler nozzle, the axial height of the side wall 38 of the fill cup 34 can be changed. Notably, the lower shell 106 of the float assembly 100 is positioned at or below the level of the top of the fill cup 34 such that when fuel flows into the fill cup 34 the float assembly is raised relatively rapidly to engage the closure 18 with the valve seat 88 and initiate the first shut-off of the fuel filler nozzle. Accordingly, regardless of the rate at which fuel is added to the fuel tank, the height of the sidewall 38 of the fill cup 34 effectively controls the fuel level at which the first automatic shut-off of a fuel nozzle is obtained. Further refueling attempts result in rapid subsequent shut-offs of the fuel filler nozzle. Accordingly, during refueling, a plurality of automatic shut-offs may be provided with overfilling of the tank being prevented by closure 18 bearing on valve seat 88 of the vapor outlet 12 to maintain a desirable vapor dome within the fuel tank. In rollover conditions, the body 22 insures that both the port 20 is closed and closure 18 bears on valve seat 88 to completely close the vapor outlet 12 to prevent the escape of both liquid fuel and fuel vapor from the tank through outlet 12.

Although usually less desirable, the valve assembly 10 can be modified by eliminating the check valve 70 in the bottom of the cup 34 and shell 32 and using a hole or holes 56 with a small enough diameter to restrict fuel flow through the bottom of the shell 32 sufficiently so that during refueling the movement of the float 16 to partially close outlet 12 is controlled by fuel flowing over the upper edge of cup 34 and through openings 50 into the interior of the shell 32.

Second Embodiment

As shown in FIGS. 5–6, a vapor vent and rollover valve 200 according to the invention may be included as a portion of a fuel pump module 14 mounted on a top wall 204 of and extending into a fuel tank 206. The module 14 preferably has a flange portion 208 constructed to be mounted on and sealed to the fuel tank 206 such as by ultrasonic welding or other connection method, and a reservoir portion 210 connected to the flange portion 208 by one or more legs 212. Desirably, the reservoir portion 210 is slidable on the legs 212 and is yieldably biased away from the flange portion 208 to ensure that the bottom of the reservoir 210 is adjacent to a bottom wall of the fuel tank 206.

The module 14 preferably contains a plurality of components all received through a single opening in the fuel tank 206. For example, the module may contain an electric motor fuel pump 214, a fuel filter 216 downstream of the fuel pump outlet and upstream of an outlet 218 of the module 14 through which fuel is delivered from the fuel tank to an engine, a fuel pressure regulator 220 which may communicate with fuel in the fuel filter 216 downstream of the fuel pump 214, a fuel level sender (not shown) having a float responsive to the level of liquid fuel in the fuel tank, electrical connectors 224 permitting wires to pass through from outside of the fuel tank into the tank, such as to power the fuel pump 214 and communicate with the fuel level sensor and other sensors, and one or more sensors 222 which communicate conditions within the tank with a CPU or other processing unit of a vehicle. The vapor vent valve 200 may be carried by the flange portion 208 of the module 14 with a vapor outlet 226 defined and molded in the flange 208 and an exterior nipple 228 on the flange 208 suitable to receive a flexible hose communicating the vapor outlet 226 with a fuel vapor canister.

As best shown in FIG. 6, the vapor vent and rollover valve 200, when incorporated as a part of the fuel pump module 14, may have all of the same components as the vent and rollover valve 10 except for the cap 60. Desirably, the cap 60 can be replaced with structure integral with the flange portion 208 of the fuel pump module 14. For instance, the shell 32 may have outwardly extending catches 64 which snap-fit into corresponding openings 230 in a depending skirt 232 of the flange portion 208. Additionally, the vapor outlet 226 and a valve seat 234 surrounding the vapor outlet 226 may be integrally formed in the flange portion 208. Desirably, the depending skirt 232 of the flange portion 208 is constructed and arranged in the same manner as the skirt 90 of the cap 60 providing a relatively circuitous vapor flow path 235 between the skirt 232 and the shell 32 requiring fuel vapor to flow between the skirt 232 and shell 32 and up over the upper end 237 of the shell 32 before reaching the interior of the valve 200 and the vapor outlet 226. This at least substantially inhibits and preferably prevents liquid fuel from escaping through the vapor outlet 226. In all other respects, the valve 200 may be constructed and arranged as disclosed with regard to the first embodiment of the valve 10. Desirably, including the valve 200 as a portion of the fuel pump module 14 eliminates the need for a separate opening through the fuel tank 206 to accommodate the valve 200. Further, to prevent leakage of fuel from the fuel tank 206 during an accident, the legs 212 interconnecting the flange portion 208 and reservoir portion 210 of the fuel pump module 202 may be frangible or constructed to break during an accident to limit the maximum force on the flange portion 208 and the connection between the flange portion 208 and fuel tank. With the valve 200 within the fuel pump module 14, the reservoir portion 210 and its contents, when they break away from the flange portion during an accident, are not flung into the valve 200 and thereby eliminate the potential damage to the valve 200 and leakage from the fuel tank which otherwise may occur as a result thereof.

Third Embodiment

Figure 7:
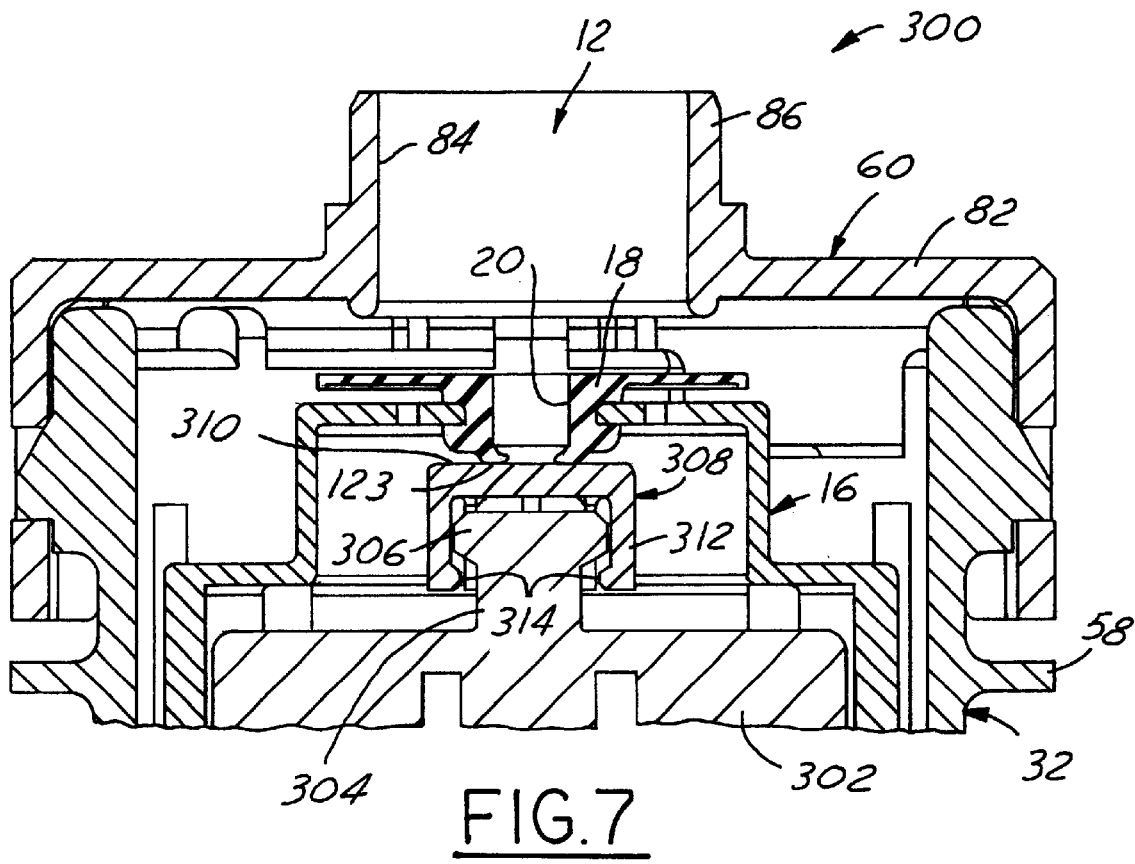
FIG. 7 is a fragmentary sectional view of a vapor vent and rollover valve assembly of a third embodiment of the invention.
Figure 8:
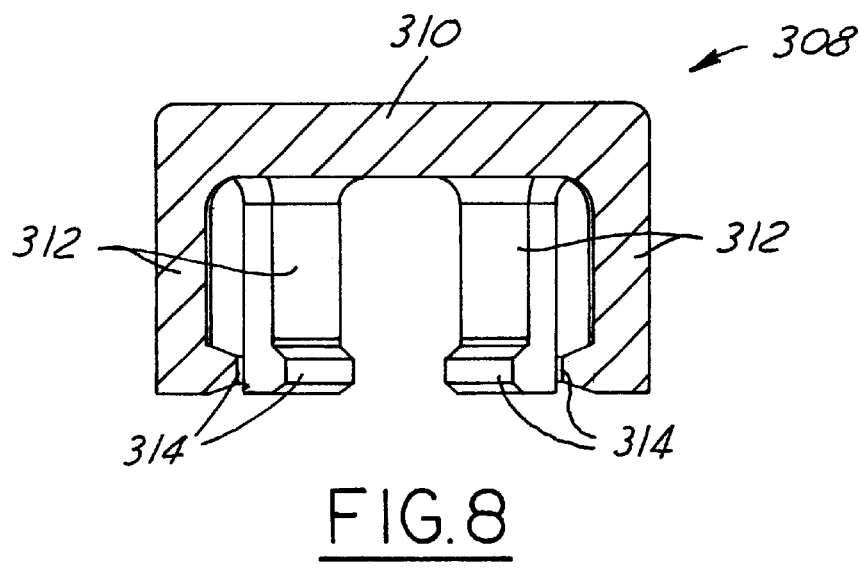
FIG. 8 is sectional view of a cage of the valve assembly of FIG. 7.

A vapor vent valve 300 according to a third embodiment of the invention, as shown in FIGS. 7 and 8, has a second body 302 carried in the first float 16 and having an upwardly projecting stem with an enlarged head 306 at one end and a cage 308 carried on the stem 304 for engaging the closure 18 and closing the vapor flow passage 20. The cage 308 preferably has an upper wall 310 and a plurality of circumferentially spaced arms 312 depending from the upper wall 310 and leading to radially inwardly extending fingers 314. The arms 312 have a length which permits axial movement of the cage 308 relative to the head 306 and the radially inwardly extending fingers 314 engage the head 306 to limit movement of the cage 308. The relative movement between the second body 302 and cage 308 provides for increased force tending to unseat the cage 308 from the closure 18 to prevent corking or sticking of the cage. Desirably, the length of each arm 312 is the same so that the head 306 engages the finger 314 on each arm 312 at essentially the same time to provide a generally uniform force on all arms 312 tending to unseat the cage 308 from the closure 18. In all other respects, the valve 300 according to the third embodiment may be constructed in the same manner as the first embodiment or second embodiment valves 10, 200.

All Embodiments

The vapor and rollover vent valves 10, 200, 300 are provided with a closure 18 having a through passage 20 of very small diameter to provide a more restrictive flow of fluid therethrough when the closure 18 is engaged with the vapor valve seat 88. The diameter of passage 20 is normally in the range of 0.010 to 0.100 and usually in the range of 0.015 to 0.050 of an inch. The diameter of passage 20 is selected to be small enough to provide during refueling and after the first automatic shut-off the fuel filler nozzle, subsequent automatic shut-offs of the fuel filler nozzle if the operator makes further attempts to fill or "stuff" the fuel tank above or beyond its normal "full" fuel level. The desired size or diameter of passage 20 for a given fuel tank can be empirically determined and is affected by numerous factors including the configuration, size and fuel capacity of the tank, the size, configuration, location and height above the top of the tank of the filler neck, resistance to vapor flow of the outlet 12 and primary valve, etc. Desirably, upon filling of the fuel tank, the first shut-off of the fuel filler nozzle is obtained when the liquid fuel flows over the fill cup 34 and raises the closure 18 of the float assembly 100 into engagement with the valve seat 88 surrounding the vapor outlet 12. Due to the small flow area of the passage 20 through the closure 18, while fuel vapor may vent from the fuel tank, it does so at a relatively slow rate requiring a longer time to reduce the pressure in the fuel tank. Accordingly, with the relatively high pressure maintained in the fuel tank the fuel fill nozzle even if actuated will not add significant additional fuel to the tank.

During refueling, upon waiting a sufficient amount of time to permit a sufficient amount of the fuel vapor to flow through the passage 20, a small quantity of additional fuel may be added to the tank if desired, however, the pressure in the tank will rapidly increase and thereby rapidly cause a second shut-off of the fuel filler nozzle. Desirably, any additional fuel shut-offs after the first shut-off are created by the restricted flow rate of vapor through the passage 20 without the second body 22 closing off the passage 20.

Preferably, the fuel tank is not filled to the point where the second body 22 is immersed in liquid fuel and the passage 20 through the closure 18 remains open so that fuel vapor may vent from the fuel tank through this passage 20 even when the tank is filled to the desired maximum fill level. Additionally, the second body 22 will cause the outlet 12 to be completely closed off in a roll over attitude such as in an accident situation.

Accordingly, a fuel vapor vent valve 10, 200, 300 of relatively simple design is provided which at least substantially inhibits and preferably prevents the escape of liquid fuel therethrough, permits control of fuel shut-off events, permits control of a maximum fill level in the fuel tank, prevents fuel leakage during a vehicle roll over accident, is rapidly responsive and of relatively low cost to manufacture. Desirably, the vent valve 10, 200, 300 can be a stand alone component separately mounted on the fuel tank or may be incorporated into a fuel pump module 14 mounted on the fuel tank.

What is claimed is:

1. A vapor vent and rollover valve for a fuel tank of a vehicle with normal and rollover attitudes comprising:

a vapor outlet communicating an interior of the fuel tank with an exterior of the fuel tank and through which fuel vapor may flow out of the fuel tank;

a fill cup having an opening at one end and a sidewall extending to the open end;

a shell defining an interior space, disposed in part in the fill cup and having a sidewall with an opening therethrough and an upper edge.

a flow passage defined between the fill cup sidewall and the shell sidewall communicating with the opening of the fill cup and the opening through the sidewall to permit fluid which flows into the opening of the fill cup to enter the interior space through the opening in the sidewall of the shell;

a float having an opening aligned with the vapor outlet, slidably received in the interior space and at normal vehicle attitudes responsive to the level of liquid fuel in the interior space to partially close the vapor outlet at or above a certain first level of fuel in the fuel tank and permit fluid flow through the vapor outlet only through the opening in the first float;

a body slidably received in the interior space and at rollover attitudes responsive both to close the opening in the float and urge the float to close the vapor outlet to prevent fluid flow through the vapor outlet even if the float and body are submerged in liquid fuel in the fuel tank;

a baffle surrounding an upper portion of the shell including the upper edge of the shell; and a vapor flow path communicating with the interior of the fuel tank at a location above the first fuel level and having an inlet defined at least in part between the baffle and the shell disposed below the upper edge of the shell, and having a portion defined above the upper edge of the shell with the vapor outlet and shell arranged so that in order for fluid in the fuel tank to reach the vapor outlet through the vapor flow path, the fluid must travel upwardly between the baffle and shell, laterally over the edge of the shell, further laterally to the vapor outlet and upwardly to flow through the vapor outlet, permitting fuel vapor to exit the fuel tank while preventing liquid fuel flow through the vapor outlet.

2. The valve of claim 1 which also comprises a bottom wall of the shell defining in part the interior space and a check valve which prevents liquid fuel flow from the fuel tank into the interior space through the opening in the bottom wall of the shell and permits liquid fuel flow from the interior space to the fuel tank under at least some fuel level conditions in the fuel tank.

3. The valve of claim 2 wherein the check valve comprises a disk buoyant in liquid fuel which when immersed in liquid fuel is raised into engagement with the bottom wall of the shell to close the opening in the bottom wall.

4. The valve of claim 3 wherein the fill cup has a bottom wall with an opening therethrough and the check valve is disposed between the bottom wall of the fill cup and the bottom wall of the shell.

5. The valve of claim 1 wherein the float has an inner chamber and the body is slidably carried in the inner chamber of the float.

6. The valve of claim 5 which also comprises a closure carried by the float, the closure having a passage therethrough defining the opening through the float, and the body is engageable with the closure to close the passage in response to certain liquid fuel level conditions in the inner chamber.

7. The valve of claim 6 wherein the closure defines a valve seat surrounding the passage and engageable by the float.

8. The valve of claim 1 wherein the shell has an outwardly extending flange which directs liquid fuel landing on the flange away from the opening of the fill cup.

9. The valve of claim 8 wherein the flange extends radially outwardly from the shell to a distance at least equal to the radial distance between the baffle and shell so that any fuel flowing out of the vapor flow path flows on the flange and is directed by the flange back to the fuel tank.

10. The valve of claim 5 wherein the float has an opening communicating the interior space with the inner chamber.

11. The valve of claim 1 which also comprises a cap attached to the shell and having an opening defining the vapor outlet.

12. The valve of claim 11 wherein the cap has a depending skirt defining the baffle.

13. The valve of claim 11 wherein the cap has mounting tabs extending therefrom connectable to a wall of the fuel tank.

14. The valve of claim 1 wherein the shell is connectable with a flange portion of a module carried by the fuel tank and the vapor outlet is defined in the flange portion.

15. The valve of claim 1 wherein the opening in the sidewall of the shell is at a height at or below the uppermost extent of the sidewall of the fill cup.

16. The valve of claim 6 wherein the second float also comprises a cage carried by the body and engageable with the closure to close the passage through the closure in response to certain liquid fuel level conditions in the inner chamber.

17. The valve of claim 16 wherein the body is movable relative to the cage and the cage has a plurality of arms of substantially the same length and fingers carried by the arms engageable with the body to limit relative movement between the cage and body.

18. A fuel pump module extending at least in part into a fuel tank of a vehicle with normal and rollover attitudes comprising:
   a flange portion connectable to a wall of the fuel tank and having a vapor outlet extending therethrough and an annular depending skirt extending into the fuel tank when the flange portion is mounted to the fuel tank;
   a reservoir portion carried by the flange portion and disposed in the fuel tank when the flange portion is mounted to the fuel tank;
   a vent valve carried by the flange portion and having:
   a shell connectable to the flange portion with an upper portion of the shell including an upper edge of the shell within and adjacent to the skirt, said shell defining an interior space and having a sidewall with an opening therethrough;
   a fill cup having a sidewall and an open end, the fill cup is received at least in part around the sidewall of the shell;
   a flow passage defined between the fill cup sidewall and the shell sidewall, and communicating the opening of the fill cup with the opening through the sidewall to permit fluid which flows into the opening of the fill cup to enter the interior space through the opening in the sidewall of the shell;
   a float having an opening aligned with the vapor outlet, slidably received in the interior space and at normal attitudes of the vehicle responsive to the level of liquid fuel in the interior space to partially close the vapor outlet at or above a certain first level of fuel in the fuel tank and permit fluid flow through the vapor outlet only through the opening in the first float; and
   a body slidably received in the interior space and at rollover attitudes of the vehicle responsive both to close the opening in the first float and urge the float to close the vapor outlet to prevent fluid flow through the vapor outlet even if the float and body are submerged in liquid fuel in the fuel tank, whereby fuel which flows over the sidewall of the fill cup and into the opening of the fill cup rapidly fills the interior space with liquid fuel to the same height as the liquid fuel in the fuel tank so that the float is rapidly responsive to the fuel level in the fuel tank when the fuel level in the fuel tank is above the sidewall of the fill cup.

19. The valve of claim 18 wherein the float has an inner chamber and the body is slidably carried in the inner chamber of the float.

20. The valve of claim 18 which also comprises a closure carried by the float, the closure having a passage therethrough defining the opening through the float, and the body is engageable with the closure to close the passage in response to certain liquid fuel level conditions in the inner chamber.

21. The valve of claim 20 wherein the closure defines a valve seat surrounding the passage and engageable by the body.

22. The valve of claim 19 wherein the float has an opening communicating the interior space with the inner chamber.

23. The valve of claim 20 wherein the body also comprises a cage carried by the body and engageable with the closure to close the passage through the closure in response to certain liquid fuel level conditions in the inner chamber.

24. The valve of claim 23 wherein the body is movable relative to the cage and the cage has a plurality of arms of substantially the same length and fingers carried by the arms engageable with the body to limit relative movement between the cage and body.

25. A vapor vent valve for a fuel tank, comprising:
   a vapor outlet through which fuel vapor may flow out of the fuel tank;
   a fill cup having an open end and a continuous imperforate sidewall leading to the open end;
   a shell disposed in part in the fill cup, defining at least in part an interior space and having an opening therethrough communicating with the open end of the fill cup, the opening being shielded from splashing liquid fuel by the fill cup; and
   a float slidably received in the interior space and responsive to liquid fuel in the interior space at least when said liquid fuel is at a level above the fill cup sidewall to partially close the vapor outlet at or above a certain first level of fuel in the fuel tank.

26. The valve of claim 25 wherein the float has an inner chamber and the body is slidably carried in the inner chamber of the float and at rollover attitudes responsive to cause the float to close the vapor outlet even when the float and body are submerged in liquid fuel in the tank.

27. The valve of claim 26 which also comprises a closure carried by the float, the closure having a passage therethrough defining the opening through the float, and the body is engageable with the closure to close the passage in response to certain liquid fuel level conditions in the inner chamber.

28. The valve of claim 26 wherein the first float has an opening communicating the interior space with the inner chamber.

29. The valve of claim 27 wherein the body also comprises a cage carried by the body and engageable with the closure to close the passage through the closure in response to certain liquid fuel level conditions in the inner chamber.

30. The valve of claim 29 wherein the body is movable relative to the cage and the cage has a plurality of arms of substantially the same length and fingers carried by the arms engageable with the body to limit relative movement between the cage and body.

31. A vapor vent and rollover valve for a fuel tank of a vehicle comprising:
   a cover connectable to a wall of a fuel tank and having a vapor outlet communicating an interior of the fuel tank with an exterior of the fuel tank and through which fuel vapor may flow out of the fuel tank;
   a shell defining an interior space and having a sidewall with an opening therethrough and an upper edge
   a float slidably received in the interior space and at normal vehicle attitudes responsive to the level of liquid fuel in the interior space to at least partially close the vapor outlet at or above a certain first level of fuel in the fuel tank;
   a baffle surrounding an upper portion of the shell including the upper edge of the shell; and
   a vapor flow path communicating with the interior of the fuel tank at a location above the first fuel level and having an inlet defined at least in part between the baffle and the shell disposed below the upper edge of the shell, and having a portion defined above the upper edge of the shell with the vapor outlet and shell arranged so that in order for fluid in the fuel tank to reach the vapor outlet through the vapor flow path, the fluid must travel upwardly between the baffle and shell, laterally over the edge of the shell, further laterally to the vapor outlet and upwardly to flow through the vapor outlet, permitting fuel vapor to exit the fuel tank while preventing liquid fuel flow through the vapor outlet.

32. The valve of claim 1 which also comprises a bottom wall of the shell defining in part the interior space and an aperture which restricts liquid fuel flow from the fuel tank into the interior space through the opening shell and permits liquid fuel flow from the interior space to the fuel tank under at least some fuel level conditions in the fuel tank.

* * * * *